(12) United States Patent
Nazri et al.

(10) Patent No.: US 8,663,840 B2
(45) Date of Patent: Mar. 4, 2014

(54) ENCAPSULATED SULFUR CATHODE FOR LITHIUM ION BATTERY

(75) Inventors: Gholam-Abbas Nazri, Bloomfield Hills, MI (US); David Burton, Waynesville, OH (US); Maryam Nazri, Bloomfield Hills, MI (US); Patrick D. Lake, Beavercreek, OH (US); Andrew Palmer, Piqua, OH (US); Max L. Lake, Yellow Springs, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 365 days.

(21) Appl. No.: 13/084,678

(22) Filed: Apr. 12, 2011

(65) Prior Publication Data

US 2012/0264017 A1 Oct. 18, 2012

(51) Int. Cl.
*H01M 4/13* (2010.01)

(52) U.S. Cl.
USPC .......... 429/218.1; 429/209; 429/231.8; 429/235

(58) Field of Classification Search
USPC .............. 429/218.1, 209, 231.8, 235
See application file for complete search history.

(56) References Cited

U.S. PATENT DOCUMENTS

| | | |
|---|---|---|
| 3,330,697 A | 7/1967 | Pechini |
| 4,391,787 A | 7/1983 | Tibbetts |
| 4,491,569 A | 1/1985 | Tibbetts |
| 4,497,788 A | 2/1985 | Bradley et al. |
| 4,565,684 A | 1/1986 | Tibbetts et al. |
| 5,024,818 A | 6/1991 | Tibbetts et al. |
| 5,374,415 A | 12/1994 | Alig et al. |
| 5,389,400 A | 2/1995 | Ting et al. |
| 5,413,773 A | 5/1995 | Tibbetts et al. |
| 5,424,126 A | 6/1995 | Tibbetts et al. |
| 5,433,906 A | 7/1995 | Dasch et al. |
| 5,587,257 A | 12/1996 | Tibbetts et al. |
| 5,594,060 A | 1/1997 | Alig et al. |
| 5,604,037 A | 2/1997 | Ting et al. |
| 5,814,408 A | 9/1998 | Ting et al. |
| 5,837,081 A | 11/1998 | Ting et al. |
| 5,846,509 A | 12/1998 | Alig et al. |
| 5,853,865 A | 12/1998 | McHugh et al. |
| 6,156,256 A | 12/2000 | Kennel |
| 6,506,355 B1 | 1/2003 | Glasgow et al. |
| 6,630,015 B1 | 10/2003 | Burton et al. |
| 6,988,304 B2 | 1/2006 | Moseley et al. |
| 7,018,607 B2 | 3/2006 | Nazri et al. |

(Continued)

OTHER PUBLICATIONS

J. Phys. Chem. C. 2009, 113, pp. 4712-4716, Synthesis and Electrochemical Performance of Sulfur-Highly Porous Carbon Composites, C. Lai, X. P. Gao, B. Zhang, T. Y. Yan, and Z. Zhou, published Feb. 20, 2009.

(Continued)

*Primary Examiner* — Jane Rhee
(74) *Attorney, Agent, or Firm* — Harness, Dickey & Pierce, P.L.C.

(57) ABSTRACT

Methods of making a cathode element for an electrochemical cell. The methods comprise providing hollow carbon nanotubes and a sulfur source in a closed environment. Sulfur is deposited within an interior of the hollow carbon nanotube. The method includes cleaning an exterior surface of the carbon nanotubes and incorporating the carbon nanotubes into a cathode element. A cathodic material for a lithium-sulfur electrochemical cell is also provided. The material comprises a plurality of stacked-cone carbon nanotubes. Each nanotube defines a hollow interior and has a substantially continuous exterior surface area. Elemental sulfur is disposed within the hollow interior of each nanotube.

20 Claims, 2 Drawing Sheets

(56) References Cited

U.S. PATENT DOCUMENTS

| | | |
|---|---|---|
| 7,297,446 B2 | 11/2007 | Fukui et al. |
| 8,048,341 B2 | 11/2011 | Burton et al. |
| 8,148,455 B2 | 4/2012 | Posudievsky et al. |
| 2008/0261116 A1 | 10/2008 | Burton et al. |
| 2009/0294736 A1 | 12/2009 | Burton et al. |
| 2010/0055465 A1 | 3/2010 | Palmer et al. |
| 2011/0151333 A1 | 6/2011 | Halalay et al. |
| 2011/0250478 A1 | 10/2011 | Timmons et al. |
| 2012/0227252 A1 | 9/2012 | Nazri |
| 2012/0229096 A1 | 9/2012 | Nazri |
| 2012/0264020 A1 | 10/2012 | Burton et al. |

OTHER PUBLICATIONS

Chinese Chemical Letters 20 (2009) pp. 1255-1258, Electrochemical Performance of Sulfer Composite Cathode Materials for Rechargeable Lithium Batteries, Feng Wu, Sheng, Xian Wu, Ren Jie Chen, Shi Chen, and Guo Qing Wang, available Jan. 8, 2009.

Journal of Alloys and Compounds 449 (2008) pp. 313-316, Improvement of Cycle Property of Sulfer Electrode for Lithium-Sulfer Battery, Young-Jin Choi, Ki-Won Kim, Hyo-Jun Ahn, Jou-Hyeon Ahn, available Jan. 24, 2007.

Nature Materials (2009) pp. 500-506, A Highly Ordered Nanostructured Carbon-Sulphur Cathode for Lithium-Sulphur Batteries, Xiulei Ji, Kyu Tae Lee, and Linda F. Nazar, published May 17, 2009.

Journal of Power Sources 195 (2010) pp. 2928-2934, Preparation of Electrochemically Active Lithium Sulfide-Carbon Composites Using Spark-Plasma-Sintering Process, Tomonari Takeuchi, Hikari Sakaebe, Hiroyuki Kageyama, Hiroshi Senoh, Tetsuo Sakai, and Kuniaki Tatsumi, available Nov. 10, 2009.

Chem. Mater. 2009, 21, pp. 4724-4730, Hierarchically Structured Sulfur-Carbon Nanocomposite Material for High-Energy Lithium Battery, Chengdu Liang, Nancy J. Dudney, and Jane Y. Howe, published Sep. 4, 2009.

Journal of Power Sources 195 (2010) 3684-3688, A High Energy Density Lithium-Sulfur-Oxygen Hybrid Battery, Sheng S. Zhang, Donald Foster, and Jeffrey Read, available Dec. 22, 2009.

Electrochimica Acta 52 (2007) pp. 2829-2840, Characterization of Silicon-and Carbon-Based Composite Anodes for Lithium-Ion Batteries, Volodymyr G. Khomenko, and Viacheslav Z. Barsukov, available Nov. 30, 2006.

Journal of Power Sources 125 (2004) pp. 206-213, Electrochemical Performance of Lithium Ion Battery Nano-Silicon-Based Disordered Carbon Composite Anodes with Different Microstructures, Xiang-Wu Zhang, Prashanth K. Patil, Chunsheng Wang, A. John Appleby, Frank E. Little, and David L. Cocke, available Jul. 31, 2003.

Journal of Power Sources 174 (2007) 823-827, Spray-Pyrolyzed Silicon-Disordered Carbon Nanocomposites for Lithium-Ion Battery Anodes, S.H. Ng, J. Wang, K. Konstantinov, D. Wexler, S.Y. Chew, Z.P. Guo, and H.K. Liu, available Jun. 29, 2007.

ENCAPSULATED SULFUR CATHODE FOR LITHIUM ION BATTERY

FIELD

The present disclosure relates to cathodes for lithium ion batteries, and related methods for forming the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the claimed invention.

Lithium ion batteries have been proven to offer higher energy and power density, a wider range of operating temperatures, and excellent cycle and calendar life when compared to other battery chemistries. Continued demand for various portable electronics, such as electric hand and power tools, as well as high power applications of electric based transportation, continues to direct research to focus on lower cost materials without compromise of reliability and life of lithium ion batteries. As a result, the lithium-sulfur cell has become an attractive option because of the high theoretical specific energy of about 2600 Wh/kg (1672 mAh/g), assuming complete reaction to $Li_2S$.

Elemental sulfur, however, poses two problems when used as a cathode active material in a lithium-sulfur cell. First, sulfur itself has a very low electrical conductivity; for example, about $5.0 \times 10^{-14}$ S $cm^{-1}$ at 25° C. Second, sulfur has a high solubility in the electrolyte of a cell during lithiation, or discharge. Dissolution of sulfur during charging and discharging reduces the capacity of an electrochemical cell, and is not preferred. For example, after dissolution, the sulfur anions then re-precipitate and react on a carbon anode surface. Accordingly, there remains a need for lithium-sulfur cell batteries having improved energy and power output. The present disclosure provides a new sulfur-containing cathode material that minimizes the current problems associated with the high resistivity, dissolution, and reactivity of sulfur, while maintaining a desired useable life. There have been many attempts in the past to compound elemental sulfur with carbon particulate to enhance electrical conductivity. In addition, recently work has been performed to trap the sulfur in micro and meso pores of carbon particulates. However, deposition of sulfur in these types of carbon did not prevent exposure of the sulfur to the electrolyte, and only provided limited cycle life with fast capacity decay. This invention provides a process and method to encapsulate sulfur in the hollow core of carbon nanofiber with high aspect ratios.

SUMMARY

This section provides a general summary of the disclosure, and is not a comprehensive disclosure of its full scope or all of its features.

In various embodiments, the present teachings provide methods for making a cathode element for an electrochemical cell. The method comprises providing hollow carbon nanotubes and a sulfur source in a closed environment. The sulfur is then deposited within an interior of the hollow carbon nanotubes. In various aspects, the deposition is carried out by heating the sulfur to a temperature greater than its sublimation point, where the vapor phase sulfur is deposited in the core of the nanotube. The method includes cleaning an exterior surface of the carbon nanotubes to remove any residual sulfur. The carbon nanotubes are then incorporated into a cathode element.

In other embodiments, the present teachings provide methods for making a cathode for a lithium-sulfur electrochemical cell. The method comprises providing hollow, stacked-cone structure carbon nanotubes and a sulfur source in a closed, inert environment at ambient pressure. The sulfur source is heated to a temperature higher than its sublimation point and elemental sulfur is deposited within an interior of the hollow carbon nanotubes. An exterior surface of the carbon nanotubes is cleaned, and the sulfur-filled carbon nanotubes are incorporated into a cathode element for a lithium-sulfur electrochemical cell.

In still other embodiments, the present teachings provide a cathode material for an electrochemical cell. The cathode material comprises a plurality of stacked-cone structure carbon nanotubes. Each nanotube defines a hollow interior and has a substantially continuous exterior surface area. Elemental sulfur is disposed within the hollow interior of each nanotube.

Further areas of applicability and various methods of encapsulating sulfur in the core of carbon nanofibers will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
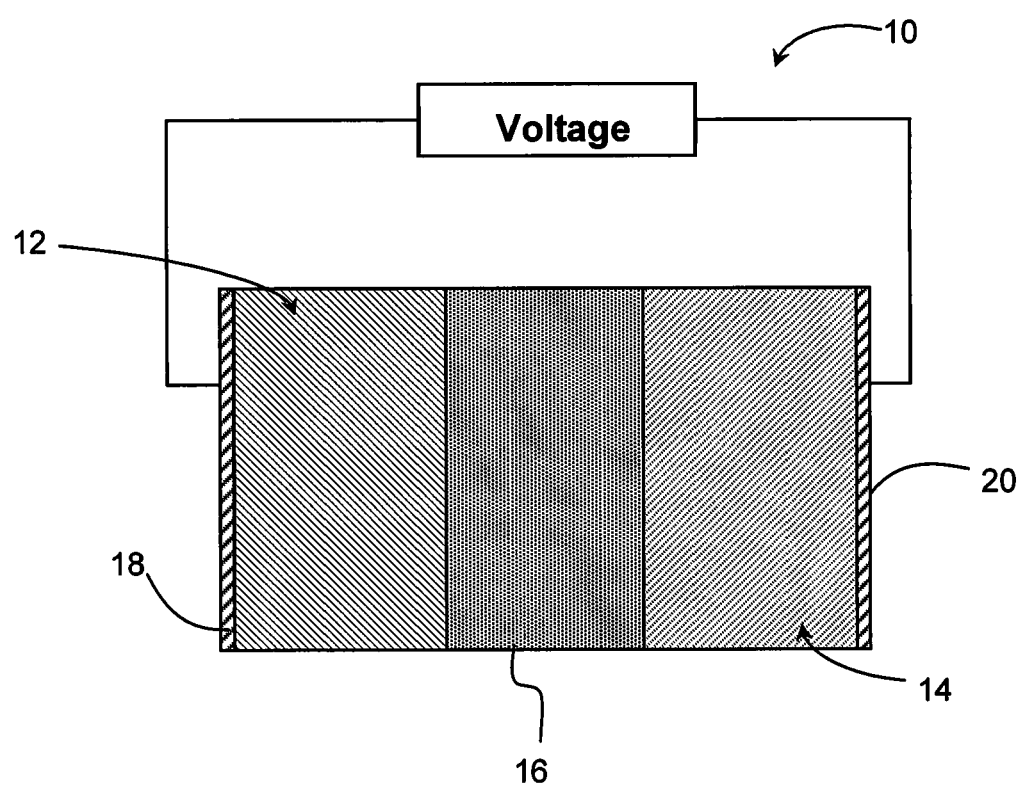
FIG. 1 depicts a schematic diagram of a representative lithium ion electrochemical cell.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical "or." It should be understood that steps within a method may be executed in different order without altering the principles of the present disclosure. Disclosure of ranges includes disclosure of all ranges and subdivided ranges within the entire range.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

The present teachings relate to improved performance cathode elements for lithium-sulfur batteries. Such lithium-sulfur batteries and components thereof may be used in a variety of applications in which primary or secondary batteries are used, including hybrid with fuel cells for automotive and transportation applications. As set forth in more detail below, the cathode elements of the present disclosure provide batteries having a higher specific energy and a longer shelf life as compared to traditional lithium-sulfur batteries by using carbon nanotubes encapsulating elemental sulfur in the cathode element. Sulfur is attractive as a cathode material due to its high charge capacity of about ten times more than conventional cathode materials, such as metal oxides. The known issues of high resistivity and reactivity of sulfur are addressed with the present disclosure of graphitic carbon nanofibers simultaneously providing an electronic pathway while the encapsulation of sulfur in the nanotube inner core protects the sulfur against dissolution in an electrolyte.

FIG. 1 provides a schematic diagram of an exemplary lithium-ion cell 10, including a negative electrode or anode element 12, a positive electrode or cathode element 14, and a separator region 16 disposed between the anode element 12 and the cathode element 14. As used herein, the terms "anode" and "cathode" are used to describe the respective electrodes in a discharge or use operation of a battery or cell 10. It should be noted that complete batteries or cells in accordance with the present teachings may also include terminals, casings, and various other components well known to those of skill in the art, which are not illustrated. The anode element 12 may be provided in various forms as is known in the art, and by way of example, may include dense lithium metal, lithium alloys such as lithium silicon and lithium tin alloys, or lithium containing porous composite electrode as desired, and a current collector 20. The material of the anode element 12 may be in various forms, such as bars, foils, pressed-powder sheets, or as otherwise known in the art. The cathode element 14 may include various active components into which lithium and inert materials can be inserted, as well as electrolytes, and a current collector 18. In various aspects, the cathode element 14 comprises hollow carbon nanotubes that are substantially filled with sulfur, as described below. As used herein, the term "substantially filled" means that the hollow carbon nanotubes are filled such that sulfur fills more than about ⅔ of the available space, or hollow core volume, within the carbon nanotube. In various aspects, it may be preferred to incorporate sulfur in amount sufficient to fill from at least about ⅓ to about ⅔ of the hollow core volume, and the remaining space may be used for any expansion of the sulfur, for example, during a lithiation process. However, many carbon nanotube fibers have a flexible hollow core and flexible aspect ratio, which can accommodate more sulfur. In certain aspects, the hollow core volume may be completely filled with sulfur, or otherwise filled to its holding capacity with sulfur. The cathode element 14 may also include a substrate, a binder, and other electrically conductive additives, for example carbon black and graphite. For example, in various aspects, elastomers such as ethylene propylene diene monomer (EPDM), poly vinyl di-fluoride (PVdF), or other binders known in the art may be used. The separator region 16 typically includes an electrolyte medium with a lithium cation, and serves as a physical and electrical barrier between the anode element 12 and the cathode element 14 so that the electrodes are not electronically connected within the cell 10. The separator region 16 may include various polymer, polymer-ceramic, ceramic separators, and both organic and inorganic additives.

It is envisioned that the electrolyte medium of the present disclosure may be a liquid, solid, or a gel. In various aspects, the electrolyte medium may include a matrix material within which one or more lithium ion electrolytes is incorporated. The lithium ion electrolyte can be any lithium ion electrolyte, for example, any of the lithium ion electrolytes known in the art. Exemplary electrolytes may be aqueous or may include non-aqueous electrolyte with a solvent system and a salt at least partially dissolved therein. Additives known to those of skill in the art may also be used with the electrolytes that serve to enhance the performance of the electrochemical cell. The lithium ion electrolyte, when incorporated in the electrolyte medium, is preferably provided in an amount that imparts a suitable level of conductivity to the electrolyte medium. The conductivity of the electrolyte medium is preferably at least about 0.01 mS/cm (0.001 S/m) at an operating temperature of interest, and particularly at a temperature from about 20° C. to about 30° C.

Figure 2:
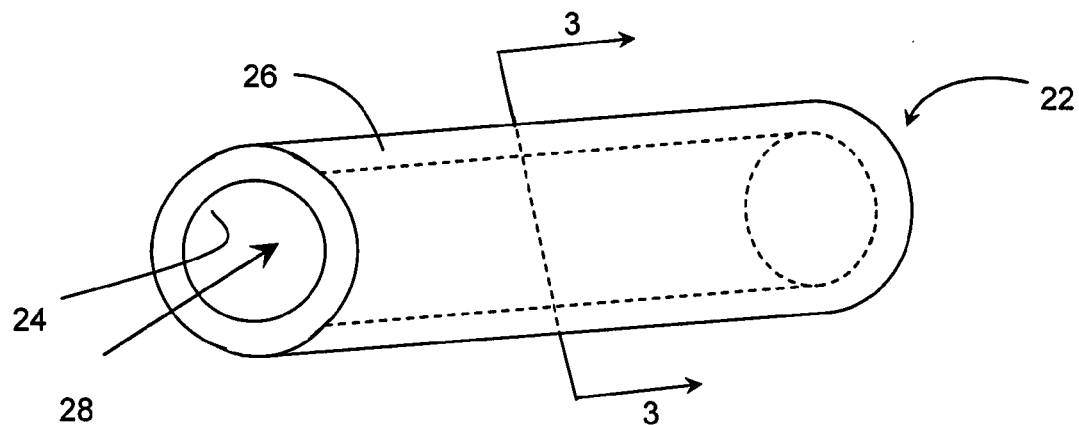
FIG. 2 depicts a plan view of a representative hollow carbon nanotube that will be filled with sulfur according to the present disclosure.
Figure 3:
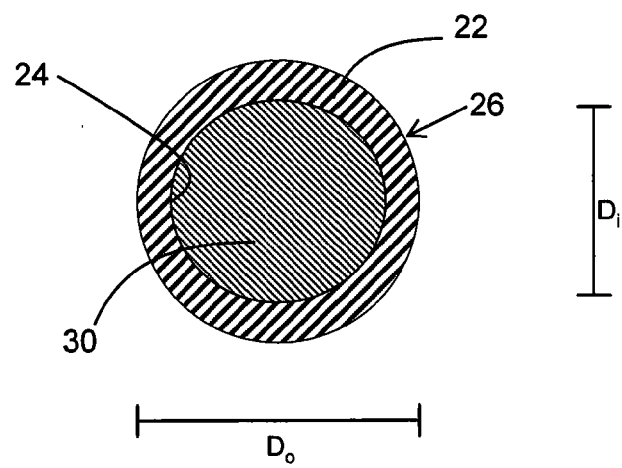
FIG. 3 depicts a cross-sectional view of FIG. 2 taken along the line 2-2 illustrating the nanotube filled with sulfur.

The present teachings include methods of making cathode elements comprising hollow carbon nanotubes containing elemental sulfur encapsulated therein. FIG. 2 illustrates a plan view of a representative hollow carbon nanotube 22 that will be at least partially filled with sulfur according to the present disclosure. FIG. 3 illustrates a cross-sectional view of FIG. 2 taken along the line 3-3, depicting the interior filled with sulfur 30. According to various aspects of the present teachings, the carbon nanotube 22 may be a single-walled, multi-walled, or a stacked-cone structure (also known as cup-stacked) suitable for providing an electron conduction path for the required redox reactions in the cell. In various aspects, the carbon nanotubes may be stacked-cone structures formed using vapor-growth techniques known in the art. Exemplary carbon nanofibers and nanotubes may be formed from methods disclosed in U.S. Pat. Nos. 4,497,788; 5,024,818; 5,374,415; and 5,413,773 (each of which is incorporated by reference in its entirety); and may be commercially obtained from Applied Sciences, Inc. (Cedarville, Ohio). Stacked-cone structures may be more desirable in certain embodiments, for example, because they may tend to minimize any stress by allowing slight changes in volume and/or shape of the structure during electrical discharge. Additionally, the fiber shell of the stacked-cone structure protects the sulfur from direct contact with an electrolyte, minimizing any dissolution of polysulfide anions into the electrolyte solution. In each instance, the nanotube 22 includes a hollow structure with an interior wall surface 24 defining a substantially uniform inner diameter ($D_i$) throughout its length, and a substantially continuous exterior surface 26 likewise defining a substantially uniform outer diameter ($D_o$). In various aspects, the carbon nanotubes may provided with an average inner core diameter ($D_i$) of from about 25 nm to about 250 nm, or from about 50 nm to about 150 nm. The carbon nanotubes may be provided with an average wall thickness of from about 5 nm to about 100 nm, or from about 10 nm to about 50 nm. An average aspect ratio of the carbon nanotubes may be from about 50 to about 10,000, or from about 500 to about 5,000, depending in part on the methods used to incorporate and deposit the sulfur within the nanotube.

It is envisioned that a high surface area nanoscale morphology of the exterior surface 26 increases the power density and assists in providing a battery that may have an energy density of greater than 200 Wh/kg. Such a composite carbon nanotube containing sulfur may be used in a secondary battery operable to provide a discharge capacity of from about 500 mAh/g to about 1,200 mAh/g, and preferably near 1,000 mAh/g.

The various methods of the present teachings include providing hollow carbon nanotubes 22 in a closed environment, such as an oven, together with a sulfur source. It may be desirable that the environment is inert and at about atmospheric pressure, although various other pressures and conditions may be feasible. For example, the operations may be carried out in a vacuum environment, or at elevated pressure. In various aspects, the temperature of the carbon nanofiber may range from sub-ambient to about 200° C. or higher, and a vacuum may range from ambient pressure to about $10^{-9}$ tor.

As used herein, the term "sulfur source" includes elemental sulfur as well as molecules and macromolecules that contain at least one sulfur atom, such as ammonium sulfate and ammonium sulfide, lithium sulfide, molten sulfur, liquids containing sulfur. Exemplary materials include organosulfur compounds, elemental sulfurs, sulfates, sulfites, sulfides, disulfides, thio compounds (thioethers, thioketones), thiols, thiolates, mercaptans, sulfones, sulfoxides, lithium sulfide, etc. In some embodiments, the sulfur source contains a negatively-charged or proton-associated sulfur atom that is covalently bound to another atom through a single bond. This type of sulfur source is capable of releasing an associated cation or proton and forming a disulfide bond with a similar atom. In other embodiments, the sulfur source may contain sulfur atoms that are multiply bound to other atoms and are not capable of forming disulfide bonds. In all aspects, the sulfur source refers to atoms, molecules, and macromolecules that contain at least one sulfur atom that can act as a redox species, in part or in whole. As used herein, the term redox species includes atoms, molecules, or macromolecules that accepts or releases one or more electrons when placed under an electric field of appropriate direction and magnitude.

Once together in the closed environment, the sulfur 30 is incorporated, i.e. deposited, within the hollow interior 28 of the carbon nanotubes 22. The present teachings provide various embodiments to incorporate the sulfur within the hollow fiber core. Non-limiting examples include techniques such as sublimation, chemical vapor deposition, physical vapor deposition, liquid deposition, melt impregnation, and combinations thereof. Typically, the sulfur source is provided in an amount that includes from about 5 wt % to about 25 wt % in excess of the theoretical amount of elemental sulfur required to fill the interior volume of the hollow carbon nanotubes, and preferably from about 10 wt % to about 15 wt % in excess. In various aspects, the filled carbon nanotube will include from about 5 wt % to about 75 wt % of sulfur. While it may presently be preferred to incorporate as much elemental sulfur into the core of the nanotube as possible, filling an entirety of each nanotube, certain aspects of the present teachings do not require the inner core to be completely filled with sulfur, although there may be decreased output of the electrochemical cell depending upon the amount of sulfur that is deposited.

In various aspects, the sulfur is deposited within an interior of the hollow carbon nanotubes using sublimation techniques. As one example, bulk elemental sulfur may be provided as the sulfur source, which is heated to a temperature greater than its sublimation point, or a temperature from about 400° C. to about 500° C., or even up to about 1,000° C., depending on the pressure. In various aspects, waste heat from other processes or reactions may be used as a heat source. Thus it is envisioned that it may be possible to make the carbon nanotube and fill the carbon nanotube with sulfur in a single manufacturing facility. Using this method, the sulfur from the sulfur source is sublimated in the presence of the carbon fiber in the closed environment, allowing the vapor phase sulfur to deposit within the core of the nanotube. The deposition rate may be controlled to prevent deposition of sulfur on the surface of the fiber and allow filling and diffusion of sulfur into the hollow core of the carbon nanofiber. With renewed reference to FIG. 2, it is believed that the sulfur is initially deposited along the interior wall 24 where it continues to build up and eventually fill the entire interior 28 of the nanotube 22. For example, the intrinsic high energy of the carbon nanofiber inner core provides the thermodynamic tendency to accumulate sulfur in the inner core prior to any surface deposition on the exterior of the nanotube.

Other ways of incorporating and depositing sulfur into the core of the nanotubes may include thermal decomposition of sulfur-containing components, such as ammonium sulfide. If the deposition of sulfur takes place using liquid components, a closed environment could be a liquid solution. One liquid deposition technique may include providing mixture of a solution of carbon nanotubes and the sulfur-containing liquid component, for example, ammonium sulfide in an acetate solvent. This mixture may be heated under suitable pressures and heating rates to incorporate and deposit sulfur into the core of the carbon nanotube. The deposition of sulfur may also comprise heating solid sulfur sources having a low decomposition temperature, and using melt impregnation techniques as are known in the art. It is envisioned that various solvents may be used as a carrier of the sulfur element; in various aspects it is preferable to use solvents with high boiling points, for example, above the melting temperature of sulfur.

Once the carbon nanotubes are filled with sulfur in an amount as desired, the present teachings provide for the cleaning of the nanotubes to remove any sulfur that may have been deposited on the exterior surface area 26 of the nanotubes. Thus in various aspects, excluding the open ends, the carbon nanotubes will be substantially free of sulfur on their exterior surfaces. The cleaning may include washing the carbon nanotubes in suitable solvents to dissolve the external sulfur deposits, for example, using carbon disulfide as a solvent bath. Other methods of cleaning and removing sulfur from the surface of carbon nanofiber mat may include pulse heating (for example a laser pulse) that preferentially removes the outer sulfur as compared to the sulfur inside the hollow core of the carbon nanofiber. Since any sulfur deposited on the exterior surface may have lower cohesion than the encapsulated sulfur, heat may be used as a cleaning step. Thus, cleaning may comprise heat treating the carbon nanotubes to a temperature sufficient to remove substantially all deposited sulfur from an exterior surface, while not affecting the encapsulated portion. As used herein, the term "substantially all" is used to mean that at least a large portion of the externally deposited sulfur is removed, so that the cathode is not detrimentally affected by the presence of any residual sulfur. In other words, the exterior surface area of each nanotube is substantially free of elemental sulfur.

Once cleaned, the carbon encapsulated sulfur nanotubes may be incorporated into a cathode element for use in a lithium-sulfur electrochemical cell as is known in the art. In accordance with method embodiments of the disclosure, a method of forming a cathode element includes providing a desired substrate. A mixture is prepared and may include the sulfur filled carbon nanotubes as well as a suitable solvent and binder that can be formed into a slurry. As is known in the art, a common xylene solvent containing ethylene-propylene diene monomer (EPDM) can be used to make a slurry of the sulfur carbon nanotube cathode. The method includes coating the slurry onto the substrate and allowing the solvent to evaporate. In various aspects, a separator is also formed, which may include inorganic filler, on at least a portion of the cathode. In accordance with further aspects, a polymeric material and/or a metal oxide may be added to the slurry, prior to coating, as known in the art.

In accordance with yet additional embodiments of the disclosure, a method of forming a lithium-sulfur battery is provided. The method includes providing an anode and preparing a cathode as described above. Forming a battery further includes forming a separator, including inorganic additives, such as clays or organically modified clays interposed between the anode and the cathode, and assembly of the necessary components for a battery as known in the art.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a cathode element for an electrochemical cell, the method comprising:
    providing hollow carbon nanotubes and a sulfur source in a closed environment;
    depositing the sulfur within an interior of the hollow carbon nanotubes;
    cleaning an exterior surface of the carbon nanotubes; and
    incorporating the carbon nanotubes into a cathode element.

2. The method of claim 1, wherein the carbon nanotubes comprise a stacked-cone structure.

3. The method of claim 1, wherein the carbon nanotubes comprise an average inner core diameter of from about 50 nm to about 150 nm.

4. The method of claim 1, wherein the carbon nanotubes comprise an average aspect ratio of from about 500 to about 5,000.

5. The method of claim 1, comprising providing the sulfur source in an amount that includes from about 10 wt % to about 15 wt % in excess of the theoretical amount of elemental sulfur required to fill the interior of the hollow carbon nanotubes.

6. The method of claim 1, wherein the sulfur source is selected from the group consisting of elemental sulfur, ammonium sulfate, ammonium sulfide, and combinations thereof.

7. The method of claim 1, wherein depositing the sulfur comprises filling at least about $2/3$ of each hollow carbon nanotube with sulfur.

8. The method of claim 1, wherein depositing the sulfur comprises a technique selected from the group consisting of sublimation, chemical vapor deposition, physical vapor deposition, and combinations thereof.

9. The method of claim 8, wherein depositing the sulfur comprises heating the sulfur to a temperature greater than its sublimation point.

10. The method of claim 1, wherein depositing the sulfur comprises a technique selected from the group consisting of liquid deposition, melt impregnation, and combinations thereof.

11. The method of claim 1, wherein the cleaning comprises heat treating the carbon nanotubes to a temperature sufficient to remove substantially all deposited sulfur from the exterior surface of the carbon nanotubes.

12. The method of claim 1, wherein the cleaning comprises washing the carbon nanotubes in a solvent bath and removing substantially all deposited sulfur from the exterior surface of the carbon nanotubes.

13. A lithium ion cell comprising the cathode prepared according to claim 1.

14. The lithium ion cell according to claim 13, comprising a specific discharge capacity of from about 500 to about 1,200 mAh/g.

15. A method of making a cathode for a lithium-sulfur electrochemical cell, the method comprising:
    providing hollow, stacked-cone structure carbon nanotubes and a sulfur source in a closed, inert environment at ambient pressure;
    heating the sulfur source to a temperature greater than its sublimation point and depositing the sulfur within an interior of the hollow carbon nanotubes;
    cleaning an exterior surface of the carbon nanotubes; and
    incorporating the sulfur filled carbon nanotubes into a cathode element for a lithium-sulfur electrochemical cell.

16. The method of claim 15, wherein depositing the sulfur comprises filling at least about $2/3$ of each hollow carbon nanotube with sulfur using a technique selected from the group consisting of sublimation, chemical vapor deposition, physical vapor deposition, and combinations thereof.

17. A cathode material for an electrochemical cell, comprising:
    a plurality of stacked-cone carbon nanotubes, each nanotube defining a hollow interior and having a substantially continuous exterior surface area; and
    elemental sulfur disposed within the hollow interior of each nanotube.

18. The cathode material of claim 17, wherein the hollow interior of each nanotube has an average inner core diameter of from about 50 nm to about 150 nm.

19. The cathode material of claim 17, wherein the hollow interior of each nanotube is at least about $2/3$ filled with elemental sulfur.

20. The cathode material of claim 17, wherein the exterior surface area of each nanotube is substantially free of elemental sulfur.

* * * * *